United States Patent Office 2,881,154
Patented Apr. 7, 1959

2,881,154

ALKYLATED THIOUREA-ALDEHYDE RESINS AND THEIR PREPARATION

Raymond Polansky and William Frank Herbes, Somerville, N.J., assignors to American Cyanamid Company, New York, N.Y., a corporation of Maine No Drawing. Application March 18, 1955
Serial No. 495,325

9 Claims. (Cl. 260—70)

The present invention relates to water-soluble hydrophilic thiourea-aldehyde condensates which have been treated with monohydric aliphatic alcohols, and also to their preparation.

Thiourea-formaldehyde resins, including those of a water-soluble nature are well known in the art. They have commonly been considered to be equivalent of urea-formaldehyde condensates; and, while this is no doubt true for some varieties of resins, it is not the case with water-soluble resins both in respect to their preparation and their stability as partial condensates in aqueous solution. For example, when a mol of thiourea is refluxed with formaldehyde in quantities of the order of 1.33 and 2.3 mols, it has been found that the reaction mixtures hydrophobe upon dilution with water after relatively short reaction periods. Yet, under the same conditions, urea-formaldehye mixtures can be refluxed considerably longer and still yield partial condensates of a water-soluble and water-dilutable nature. Moreover, even when water-soluble thiourea-formaldehyde resins are obtained, they have a serious drawback in their lack of stability, especially in concentrated solutions, which is manifested by a tendency to precipitate as crystals, or even more so in respect to hydrophobing upon dilution with water. As a result, it has been customary to prepare the water-soluble variety of these resins immediately prior to their use. This has, of course, limited their utility greatly since many potential users lack the skill and equipment for the manufacture of resins. While numerous water-insoluble or hydrophobic precondensates have been prepared with thiourea, formaldehyde and an alcohol as adhesives and for molding purposes, etc., there has been no suggestion that a stable hydrophilic or water-dilutable resin of relatively low formaldehye content could be prepared in this manner. Relatively large proportions of formaldehye, as for example a 3:1 formaldehyde:thiourea molar ratio, have been employed to solubilize or stabilize such resins at least temporarily. However, this practice is objectionable for many purposes, inasmuch as an aqueous solution of the resin contains a relatively large amount of free formaldehye which is a health hazard to operators working around the open tanks which are conventionally employed in certain industries since it produces dermatitis and has a sharp, unpleasant odor. In addition, the presence of excessive quantities of free formaldehyde in resins employed in the treatment of textiles results in unsalable products having a fish odor, even after the resin-treated fabric is cured and subjected to a process wash.

An object of the present invention is to provide improved hydrophilic thiourea-aldehye resins.

A further object of the invention is to provide hydrophilic thiourea-formaldehyde resins of improved stability against hydrophobing and crystallization.

Still another object of the invention is to provide an efficient process for the manufacture of stable hydrophilic thiourea-formaldehyde condensates.

Other objects and advantages of the invention will be apparent to those skilled in the art upon consideration of the detailed disclosure hereinbelow.

The present invention is concerned with a process and the resulting product of treating relative proportions of 1.0 mol of a hydrophilic aldehyde condensate of thiourea on a monomeric basis with at least about 0.4 mol of a water-soluble aliphatic monohydric alcohol at a temperature between about 45 and about 65° C. and pH between about 4.5 and about 5.6, followed by halting the reaction after a substantial amount of alcohol has reacted and before a sample of the reaction mixture hydrophobes in 50 volumes of water at 20° C. Narrower aspects of the invention relate to the selection of methanol and formaldehyde as the preferred alcohol and aldehyde and to the combination of the above alcohol treatment with the preparation of the hydrophilic thiourea-aldehyde condensate.

It has been found that thiourea-aldehyde condensates may be stabilized by the above treatment against both hydrophobing, which is defined herein as precipitating upon diluting one part of sample with 50 parts of water by volume at 20° C., and against crystallizing or separating in the undiluted resin solution for comparatively long periods. Hydrophobing is generally attributed to an increase in molecular weight resulting from condensation polymerization. The stabilizing and inhibiting effects of the present invention are needed the most and are the most pronounced in the case of concentrated aqueous solutions of the thiourea-aldehyde condensates.

A water-soluble monohydric alcohol is employed in the present process. Among the suitable compounds are methanol, ethanol, propanol, and isopropanol, as well as mixtures of two or more of these alcohols. Higher alcohols are unsatisfactory since they decrease the hydrophilic characteristics with which the present invention is particularly concerned. Methanol is greatly preferred for the purpose, as it enhances the hydrophilic characteristics of the product and is one of the cheapest readily available alcohols on the market.

In preparing the hydrophilic condensates which are used herin as reactants, a wide variety of water-soluble aldehydes may be employed, including formaldehyde, acetaldehyde, propionaldehyde, glyoxal, and the like. Formaldehyde is preferred, especially in its more concentrated forms, such as paraformaldehyde and hexamethylene tetramine since they obviate or at least lessen the need for concentrating the final product. However, formalin may be used, or other formaldehyde-engendering substances may be employed where desired. The expression "formaldehyde" is used in a generic sense herein to denote not only formaldehyde but also its polymers, formaldehyde-engendering substances and other equivalents, inasmuch as these all produce formaldehyde as least momentarily during the condensation.

A hydrophilic thiourea-aldehyde condensate is required for the present purposes, and this may be obtained by reacting from about 1.0 to about 2.3 mols of a water-soluble aldehyde per mol of thiourea at a pH above 7.0. Larger amounts of the aldehyde are undesirable since the final product will be extremely odorous as a result of the large amount of an aldehyde of pungent odor in the free state in equilibrium in the solution with the combined aldehyde which is bound to the thiourea. In order to ascertain that the condensation with the aldehyde has not been carried too far, samples of the reaction mixture may be removed at frequent intervals and tested for hydrophobing in the manner described hereinbelow. Suitable reaction conditions are a pH between about 7.2 and about 10.5 and a reaction temperature between about 45 and about 70° C. for a period of about 1 to 3 hours. As is apparent from the examples below, this methylolation may be and preferably is carried out in the presence of the alcohol which is later reacted with the condensate under specified acid conditions.

Although the nature of the present reaction has been postulated as an alkylation or etherification by condensation of the alcohol with one or more of the hydroxyl groups in monomethylol thiourea or dimethylol thiourea, this has not been established with certainty. It is also thought that the reaction products disclosed herein are essentially monomeric in nature, for it is unlikely that the solubility characteristics obtained could be secured with highly polymerized materials. Nevertheless, it is possible that the novel products contain appreciable and perhaps even major proportions of low-order condensation polymers, such as dimers, trimers, etc. Although the alcohol is preferably present in the reaction mixture in molar excess relative to the thiourea-aldehyde condensate on a monomeric basis, only a minor amount of the alcohol seems to react. However, it appears that only a partial reaction with the alcohol is necessary to greatly enhance the stability of the condensate, as for instance, the alkylation of about 10% up to about 20 or 30% or possibly even more available alkylol groups. Expressed otherwise, between about 0.1 and about 0.3 mols and possibly more of the alcohol should combine per mol of thiourea-aldehyde condensate present calculated on a monomeric basis.

Careful control of reaction conditions is required in the present invention, for the temperature and acidity are quite critical in procuring reaction of the alcohol to the proper extent. The pH must be maintained between about 4.5 and about 5.6, while the temperature is held between about 45 and about 65° C. Temperatures of 50 to 55° C. are preferred along with a pH of 5.0 to 5.4 for the best results. The alcohol may suitably be present in relative proportions ranging from about 0.4 up to 8 or more mols per mol of thiourea-aldehyde condensate. The preferred range is from about 0.8 up to about 3 mols of the alcohol, inasmuch as the storage stability of the product is somewhat lower when less than 0.8 mol of alcohol is employed. Large excesses of the alcohol appear to do no harm, but are not necessary and sometimes require an additional step of removing the excess alcohol by distillation under subatmospheric pressure. Where a concentrated product is sought, it is usually desirable to employ relatively small quantities of alcohol, as for example, from 1 to 1.3 mols per mol of original thiourea.

The reaction time varies inversely with the severity of reaction conditions and is generally between about 30 minutes and 2 hours. When any process variables are changed, the proper reaction time should be determined by experiment. This may be done very simply by removing small samples of the reaction mixture at 5 or 10 minute intervals during the course of the reaction until one of these samples hydrophobes upon dilution with 50 times its volume of water at 20° C. When the sample becomes cloudy upon dilution, the reaction has proceeded too far for the purposes of the present invention; and the reaction time should be decreased about 20 to 80% in order to react the alcohol to the stage specified above. In general, a decrease of about one-third in such reaction time is recommended. An underreacted product is evidenced by little or no gain in stability against precipitation or hydrophobing. Halting the reaction at the proper point is a critical and essential part of the present invention, as materials which have been reacted to the stage where they will crystallize or hydrophobe do not accomplish the desired results. The reaction may be stopped by adjusting the pH of the mixture to a neutral or alkaline value, pH's of the order of 7.0 to 8.5 being preferred, although a higher pH may be used if desired, accompanied usually also by cooling the reaction mixture to about room temperature. Where a more concentrated product is required, this may be obtained by vacuum distillation at temperatures ranging from 25 to 55° C. to avoid further condensation of the reaction mixture. Concentrations of 75 to 80% solids are readily achieved when a relatively small amount of alcohol is used; and even higher solids contents are obtainable by the aforesaid vacuum distillation.

The products of the present invention are useful in fields wherein the water-soluble thiourea-aldehyde condensates are employed, including paper making, as chemical intermediates and as resin finishes for textiles, as exemplified by the article entilted "A New Way to Flameproof Nylon" by R. C. Axtmann and A. T. Swift in the Textile World, vol. 101, pp. 130 and 216, March 1951. These precondensates are readily converted into the water-insoluble state by curing at an elevated temperature in the presence of a suitable curing catalyst. An outstanding feature of the present materials is their relatively long shelf life at high concentrations of solids. This permits marketing concentrated solutions with attendant lower shipping costs due to the smaller proportion of water in the product.

The desired product is a clear, stable solution containing from about 10 to 30 or more mol percent combined alcohol based on the thiourea-aldehyde condensate. Typically it has a viscosity at 25° C. of the order of 30 to 40 centipoises and a specific gravity of about 1.2 at 25° C.

For a better understanding the nature and objects of this invention, reference should be had to the following illustrative examples in which all proportions are given in terms of weight unless otherwise stated therein.

EXAMPLE I

Into a 3-liter, 3-necked flask equipped with a thermometer, stirrer, reflux condenser and an electric heating mantle are charged 606 grams (18.9 mols) of methanol, 1368 grams (18.0 mols) of thiourea and 9.0 ml. of 50% aqueous triethanolamine. This mixture is heated to 50° C. and then 714 grams (21.6 mols) of 91% paraformaldehyde is added with constant stirring. After one hour, it is noted that solution is nearly complete; and the pH is found to be 8.8. The temperature is maintained at 50 to 55° C. for another hour; then 19.5 ml. of a 5 N aqueous solution of formic acid is added to lower the pH to 5.1. The reaction mixture is held for another hour in the 50 to 55° C. temperature range, after which it is adjusted to pH 8.0 with 18 ml. of 5 N aqueous sodium hydroxide followed by cooling to room temperature and clarifying by filtration.

A chemical analysis of the reaction product of this example follows:

| Ingredient | Percent Found | 1 Mol Basis |
| --- | --- | --- |
| Total Formaldehyde | 23.5 | |
| Free Formaldehyde | 2.8 | |
| Combined Formaldehyde | 20.7 | 1.00 |
| Thiourea | 51.4 | 0.98 |
| Total Methanol | 20.1 | |
| Free Methanol | 16.0 | |
| Combined Methanol | 4.1 | 0.18 |
| Extent of Methylation | 18.0 | |

The extent of methylation, 18.0%, represents the ratio of the number of mols of methylol thiourea which have been methylated to the number of mols of methylol thiourea available for methylation or, more simply, mols of combined methanol per mol of combined formaldehyde.

The percent of combined formaldehyde is taken as the difference between percent total formaldehyde and percent free formaldehyde. The free formaldehyde content is determined by the conventional sulfite method in the presence of a known amount of acid, back titrating with a caustic soda solution. The total formaldehyde figure is determined by a special method developed for use in resins in which sulfur is present. This method consists of hydrolyzing the resin with phosphoric acid in the presence of mercuric oxide (mercuric oxide is used to prevent interference of the sulfur). The methanol and the formaldehyde are distilled off into water, and total formaldehyde is determined by the standard alkaline peroxide method.

The percent combined methanol is taken as the difference between the percent total methanol and the percent free methanol. The total methanol figure is obtained by dichromate oxidation of the aforementioned distillate and back titration with thiosulfate, correcting for the formaldehyde which is also oxidized under these conditions. Free methanol is determined by a special method, in which the free methanol is esterified with a known excess of phthalic anhydride in the presence of pyridine. The unreacted phthalic anhydride is then converted to phthalic acid, and the free methanol content is calculated by determining the amount of ester formed. The thiourea content is obtained by the standard Kjeldahl nitrogen method or by oxidizing the sulfur in a Parr bomb followed by its conversion to barium sulfate.

Stability tests are carried out by storing samples of the reaction product at 25° C. and in a refrigerator maintained at 12° C. and making frequent visual examinations for any signs of crystallization or precipitation, as well as frequent dilution tests employing 50 parts of water at 20° C. per part of sample to determine any tendency to hydrophobe. The shelf life of the refrigerated sample is from 3 to 5 weeks while the sample kept at 25° C. meets the stability tests for more than two weeks.

*Comparative Example A*

Example I is repeated with all conditions maintained the same except that the quantity of formic acid added is sufficient to lower the pH only to the value 5.8.

A chemical analysis of the reaction product of this example follows:

| Ingredient | Percent Found | 1 Mol Basis |
| --- | --- | --- |
| Total Formaldehyde | 23.4 | |
| Free Formaldehyde | 4.6 | |
| Combined Formaldehyde | 18.8 | 1.00 |
| Thiourea | 52.4 | 1.10 |
| Total Methanol | 21.8 | |
| Free Methanol | 20.7 | |
| Combined Methanol | 1.1 | 0.05 |
| Extent of Methylation | 5.0 | |

The methods of analysis for this example are similar to those described in Example I.

The storage stability is found to be only one day at 12° C. and four days at 25° C. because of crystallization.

*Comparative Example B*

Example I is repeated with all conditions maintained the same, except that oxalic acid is added to lower the pH to 4.2–4.4. The sample crystallizes to a solid during the final cooling cycle.

*Comparative Example C*

Example I is repeated with all conditions maintained the same except that the reaction temperature is decreased to 35–40° C. A major part of the reactants do not go into solution, and the reaction mass remains a white slurry.

EXAMPLE II

Example I is repeated with all conditions maintained the same except that only 0.4 mol of methanol per mol of thiourea is used, and water is used to replace the omitted quantity of methanol. The product is found to have a storage stability of eight days at 25° C. and more than one month at 12° C. Although less desirable than the product of Example I, the instant composition is suitable for commercial use, especially where refrigerated storage is available.

EXAMPLE III

Reactants in the form of 165 grams (5.2 mols) of methanol, 304 grams (4.0 mols) of thiourea, 5 ml. of 50% aqueous triethanolamine and 290 grams (8.8 mols) of 91% paraformaldehyde are charged into a one-liter flask equipped in the manner set forth in Example I. This charge is heated to the 50 to 55° C. range and maintained at that temperature for two hours with continual stirring throughout the reaction period. Next, 5 ml. of 5 N formic acid are added to pH 5.5, and the reaction mixture is held at the stated temperature for another hour. The pH is then raised to 8.5 by stirring in 5 ml. of 5 N aqueous sodium hydroxide solution in order to halt any further reaction; then the batch is cooled to room temperature and filtered.

The reaction product here is found to possess a shelf life of the same order as that of Example I.

EXAMPLE IV

The procedure of Example I is duplicated, using the following quantities of reactants: 160 grams (5.0 mols) of methanol, 304 grams (4.0 mols) of thiourea, 237 grams (7.2 mols) of paraformaldehyde, 4.0 ml. of 50% aqueous triethanolamine, 5.0 ml. of 5 N aqueous sodium hydroxide.

Upon testing, this product also displays a storage stability similar to that of the composition produced in Example I.

EXAMPLE V

A one-liter flask is equipped is in Example III and charged with 378 grams (6.3 mols) of isopropanol, 456 grams (6.0 mols) of thiourea and 3 ml. of 50% aqueous triethanolamine. After heating these ingredients to 50° C., 238 grams (7.2 mols) of 91% paraformaldehyde are added; and the batch is held at 50 to 55° C. for two hours with constant stirring. Next, 14 ml. of 5 N formic acid are added to reduce the pH to 4.9, and the temperature is maintained at the stated range for another hour. Sufficient 5 N sodium hydroxide solution is added to increase the pH to 7.8, and the reaction mixture is cooled to room temperature and clarified by filtration.

This product displays a substantially increased resistance to hydrophobing and crystallization in comparison with material which is reacted in a similar manner in the absence of the alcohol.

EXAMPLE VI

Example V is repeated with 6.3 mols of ethanol substituted for the isopropanol, and similar results are obtained.

Although the treatment of textile fabrics forms no part of the present invention, the products described herein possess outstanding utility as components of the resin mixtures used in the finishing of textile fabrics, as described and claimed in the concurrently filed application Serial No. 495,326 of L. J. Moretti and W. N. Nakajima.

While there are above disclosed only a limited number of the embodiments of the process and the product of the invention herein-presented, it is possible to produce still other embodiments without departing from the inventive concept hereindisclosed; and it is desired, therefore, that only such limitations be imposed on the appended claims as are stated therein.

What we claim is:

1. A process which comprises reacting at a temperature between about 45 and about 65° C. and pH between about 4.5 and 5.6, a water-soluble aliphatic monohydric alcohol containing from 1 to 3 carbon atoms and a hydrophilic thiourea-formaldehyde condensate, said alcohol and formaldehyde condensate of thiourea being reacted in relative proportions of at least about 0.4 mole of alcohol per mole on a monomeric basis of said formaldehyde condensate of thiourea, halting the reaction after a substantial amount of alcohol has reacted, said substantial amount being at least about 0.1 mole of alcohol combined per mole of thiourea-formaldehyde condensate present calculated on a monomeric basis, and before a sample of the reaction mixture hydrophobes upon dilution with 50 volumes of water at 20° C.

2. A process according to claim 1 in which said alcohol comprises methanol.

3. A process according to claim 1 in which said alcohol comprises ethanol.

4. A process according to claim 1 in which said alcohol comprises isopropanol.

5. A composition of matter which comprises the reaction product according to claim 1.

6. A process which comprises treating relative proportions of 1 mol of thiourea with between 1.0 and 2.3 mols of formaldehyde at a temperature between about 45 and about 70 degrees centigrade and a pH above 7 to produce a hydrophilic condensate, treating the condensate with at least about 0.4 mol of a water-soluble aliphatic monohydric alcohol containing from 1 to 3 carbon atoms at a temperature between about 45 and about 65 degrees centigrade and pH between about 4.5 and about 5.6 and halting the latter reaction after a substantial amount of alcohol has reacted, said substantial amount being between about 0.1 and about 0.3 mole of alcohol combined per mole of thiourea-formaldehyde condensate present, calculated on a monomeric basis and before a sample of the reaction mixture hydrophobes upon dilution with 50 volumes of water at 20 degrees centigrade.

7. A process according to claim 6 in which said alcohol comprises methanol.

8. A composition of matter which comprises the reaction product according to claim 6.

9. A composition of matter which comprises the reaction product according to claim 7.

References Cited in the file of this patent

UNITED STATES PATENTS

| 2,329,651 | Powers et al. | Sept. 14, 1943 |
| 2,645,625 | Bonzagni | July 14, 1953 |
| 2,681,326 | Christianson | June 15, 1954 |

FOREIGN PATENTS

| 677,184 | Great Britain | Aug. 13, 1952 |

OTHER REFERENCES

Walker: "Formaldehyde," 2nd edition, Reinhold Publ. Corp., New York (1953), page 308. (Copy in Division 60.)

Ellis: "Chemistry of Synthetic Resins," vol. I, Reinhold Publishing Co., N.Y., page 654. (Copy in Scientific Library.)